United States Patent [19]

Westerlund et al.

[11] 4,432,558
[45] Feb. 21, 1984

[54] CONCRETE PUMPING SWIVEL COUPLING APPARATUS WITH SEAL

[76] Inventors: Robert E. Westerlund, 10904 N. Westview, 41W, Mequon, Wis. 53092; Wayne L. Read, 4913 Hillside Rd., West Bend, Wis. 53095

[21] Appl. No.: 327,565

[22] Filed: Dec. 4, 1981

Related U.S. Application Data

[60] Division of Ser. No. 866,615, Jan. 3, 1978, Pat. No. 4,305,607, which is a continuation-in-part of Ser. No. 762,381, Jan. 26, 1977, abandoned.

[51] Int. Cl.³ .................... F16J 15/00; F16L 27/00
[52] U.S. Cl. .................................. 277/180; 277/101; 285/112; 285/272; 285/373; 285/383
[58] Field of Search ............... 277/101, 167.5, 180, 277/212 R, 212 C, 81 R; 285/94, 98, 112, 272, 281, 365–367, 373, 383, 411

[56] References Cited

U.S. PATENT DOCUMENTS

| | | | |
|---|---|---|---|
| 1,866,160 | 7/1932 | Griswald | 277/180 X |
| 1,980,335 | 11/1934 | Hewitt et al. | 277/180 |
| 2,188,314 | 1/1940 | Scheffauer | 285/94 X |
| 2,295,510 | 9/1942 | Ball et al. | 285/373 X |
| 2,341,449 | 2/1944 | Krone et al. | 285/94 |
| 2,575,938 | 11/1951 | Brenneke | 285/94 X |
| 2,962,305 | 11/1960 | McCarthy et al. | 285/367 X |
| 3,215,442 | 11/1965 | Papenguth | 277/180 |
| 3,302,953 | 2/1967 | Glasgow | 277/180 |
| 3,355,181 | 11/1967 | Olson | 277/180 |
| 3,705,737 | 12/1972 | Westerlund et al. | 24/271 X |
| 3,967,837 | 7/1976 | Westerlund et al. | 285/365 X |
| 4,305,607 | 12/1981 | Westerlund et al. | 285/94 |

FOREIGN PATENT DOCUMENTS

| | | | |
|---|---|---|---|
| 2048569 | 4/1972 | Fed. Rep. of Germany | 277/180 |
| 2227911 | 3/1973 | Fed. Rep. of Germany | 285/365 |
| 1046421 | 7/1953 | France | 285/272 |
| 1120663 | 4/1956 | France | 277/81 R |
| 1222943 | 1/1960 | France | 277/180 |
| 541778 | 4/1956 | Italy | 277/81 R |
| 554738 | 1/1957 | Italy | 285/365 |
| 430351 | 8/1967 | Switzerland | 285/365 |
| 371121 | 4/1932 | United Kingdom | 285/94 |
| 689932 | 4/1953 | United Kingdom | 285/94 |

Primary Examiner—Robert S. Ward, Jr.
Attorney, Agent, or Firm—Andrus, Sceales, Starke & Sawall

[57] ABSTRACT

A swivel coupling apparatus includes a pair of aligned metal pipe sections having grooved outer ends for connecting to hoses and rigid pipes by releasable clamp units. A gasket is disposed between the smooth end faces and an outer clamp housing encircles the end portions to mechanically connect the pipe sections. The pipe sections have outer shoulders with inclined clamp walls. The clamp housing includes a pair of semi-circular members having bolt clamping lugs for drawing the members onto the shoulders. The members having outer side clamp legs defining a cavity. A central rectangular spacer projects partially into the cavity for location between the outer portion of the end faces. The cavity has annular base walls between the spacer and side legs aligned with and outwardly spaced from the outer peripheral walls of the shoulders. Grease fittings to the opposite sides of the spacer provide for introducing of grease into the free space. The spacer has a smooth inner wall forming a backing for the gasket. The ring gasket is formed with a rectangular outer body and inner flared side lips with a curved base wall on the inner face to define a pressure chamber. The pumped concrete moves into the chamber and acts on the side lips to increase the sealing effect of the gasket.

4 Claims, 6 Drawing Figures

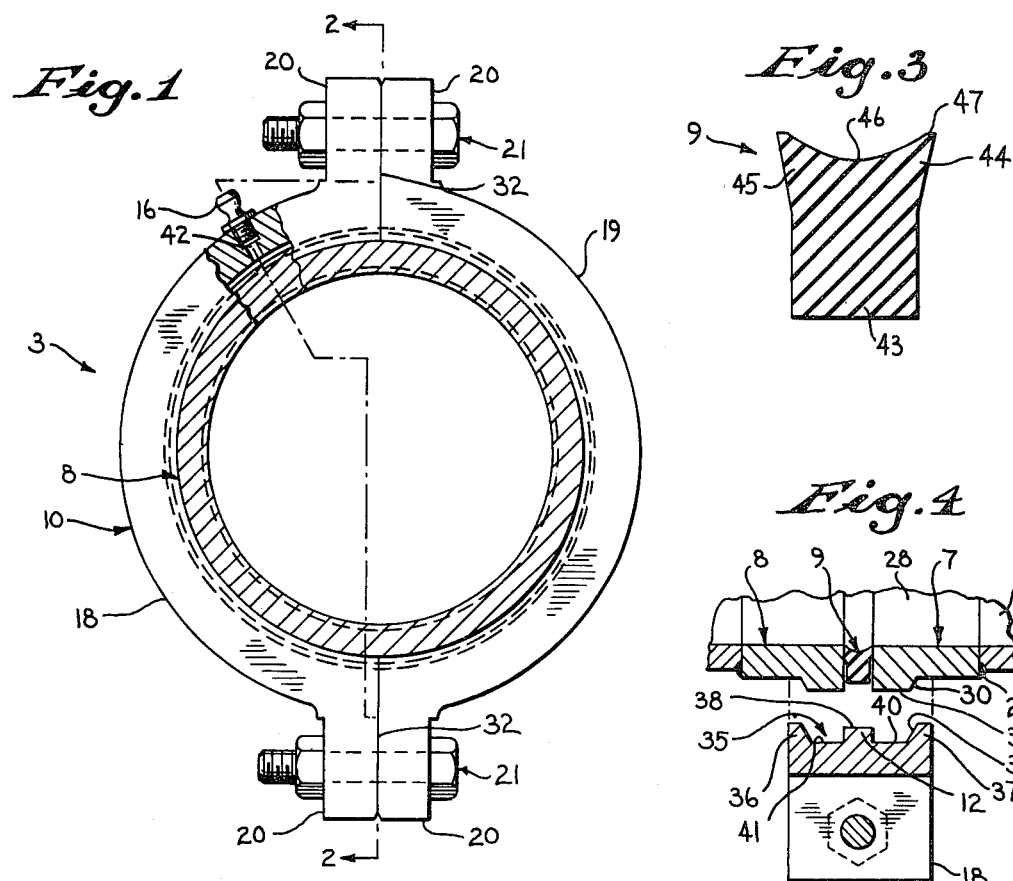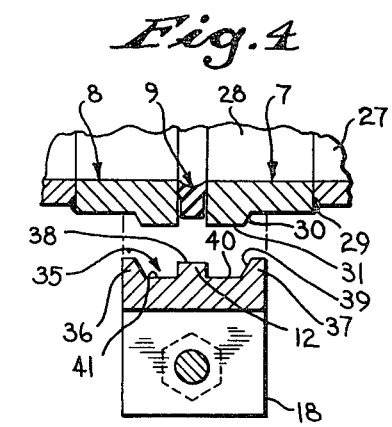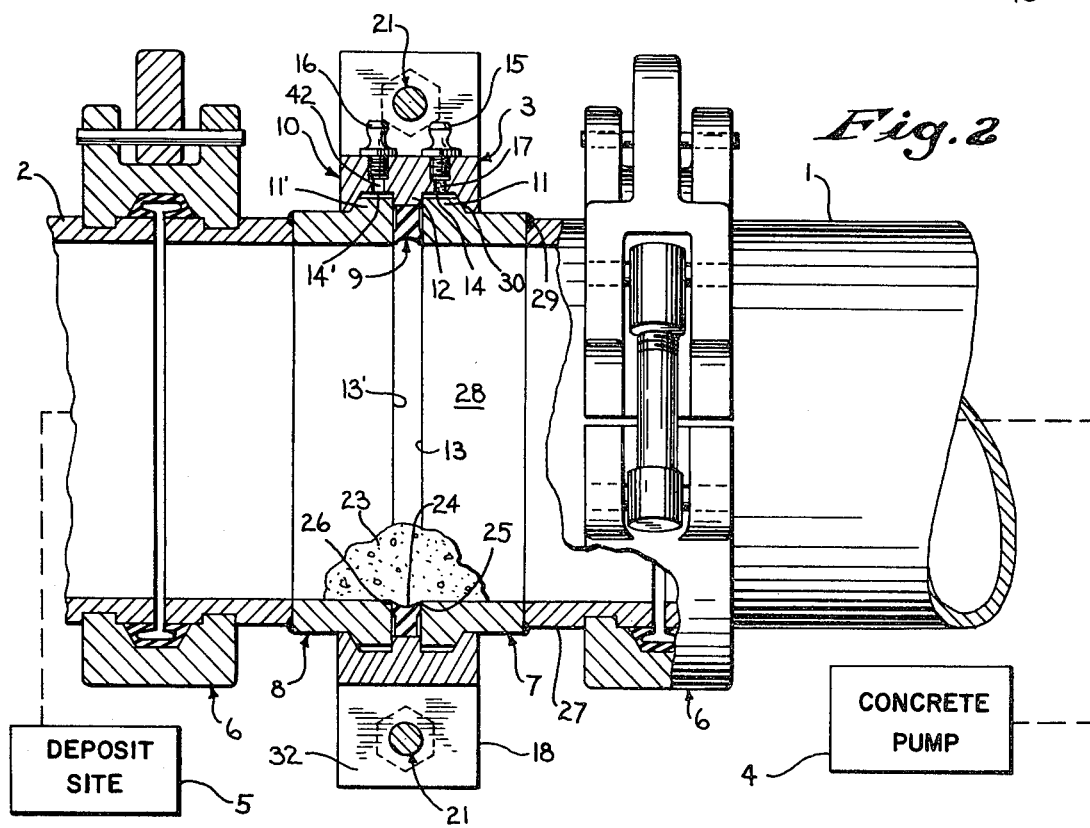

CONCRETE PUMPING SWIVEL COUPLING APPARATUS WITH SEAL

This is a divisional application of application Ser. No. 866,615, filed Jan. 3, 1978, now U.S. Pat. No. 4,305,607, which was a continuation-in-part of application Ser. No. 762,381, filed Jan. 26, 1977, now abandoned.

BACKGROUND OF THE INVENTION

This invention relates to a high pressure swivel coupling for concrete pumping systems.

Concrete placement systems have been developed employing concrete pumping apparatus for transporting the concrete from a central location to a depositing location. The concrete is trucked to the installation site and then transferred to the actual drop location through the pressurized pumping system. Each installation, of course, presents unique flow requirements. The pumping systems therefore require special design. Generally, standardized pipe sections of a rigid metal pipe and/or flexible hose are releasably connected to each other to produce a most convenient transfer flow pattern. Concrete pumping systems may employ working pressures on the order of 200 to 2,000 PSI (pounds per square inch) and under operating conditions surge pressures on the order of 8,000 and 9,000 PSI are encountered. In order to maintain an essentially liquid tight connection between the pipe sections requires relatively heavy duty pipe couplings. However, within any given system, the flow path may be changed from time to time and the interconnecting couplings should be constructed to permit convenient and rapid connection and disconnection. Various bolted and toggle-type couplings have been suggested for providing quick connection. In certain installations, the piping sections may be subjected to various twisting actions. For example, in various boom applications, interconnecting hoses are secured to the boom and move therewith. The boom may be formed with folding and relatively moving boom sections. The movement of and within the boom may exert a twisting action on the hose sections. With the rigid firm interconnection provided by conventional couplings the hose is actually twisted. Although very minor or minimal twist action will not adversely effect the hose structure, continuous twisting or heavy twisting action is particularly undesirable and may result in an eventual hose rupture. There is therefore a need for a coupling permitting a swivel or twisting movement between the adjacent hose sections thereby eliminating the twist forces applied directly on the hose. However, to provide a highly effective liquid type joint coupling which will withstand the high pumping pressures involved in concrete pumping and the like, presents difficult problems and has prevented low cost, reliable swivel couplings in concrete pumping systems.

SUMMARY OF THE PRESENT INVENTION

The present invention is particularly directed to a swivel coupling having lubricating means and constructed for a reliable and long life operation in high pressure concrete pumping systems and the like. Generally, in accordance with the present invention, rigid connecting members are formed with flat opposed end faces and an outer clamping enlargement, having inclined radially outer walls. A sealing gasket is located between the opposed flat end faces. An encircling multiple part clamp unit is formed with outer clamping legs which project down over the enlargements to define an inner cavity or recess and includes inclined clamp walls providing an interference fit with the clamp walls of the shoulders and draws the connecting members toward each other. In addition, the clamp unit includes a centrally located spacer within the cavity which extend between the two connecting members and limits the clamping action exerted by the members. The spacer is generally of the same width as the gasket to hold the gasket in position. The inner face of the gasket is recessed to define abutting lips engaging the innermost portion of the faces of connecting members.

The construction is such that with the coupling members tightened fully, a small gap or free space is created between an inner annular base in the member and the outer annular walls of the shoulders. The grease coupling means in the coupling unit provide for introducing a suitable lubricant into such annular free space. The inventors have found that the lubricated coupling provides a very satisfactory high pressure seal and in particular that the spaced connecting members and lubricant interposed between the steel to seal surfaces to the opposite sides of the spacer produce a swivel coupling which swivels and twists in the presence of pressures encountered in concrete pumping systems and particularly in excess of 200 PSI.

In accordance with a particularly unique aspect of the present invention, the interposed gasket is uniquely constructed as solid gasket member which essentially completely fill the gap between the end faces of the connecting pipe sections with the inner most face thereof slightly recessed to define lips terminating essentially at the inner surface of the pipe sections. The gasket member presents a small chamber with adjacent sidewall lips abutting the innermost end of the opposed end faces. The minimal chambers severely limit introduction of any significant concrete material into the gap therebetween while maintaining an effective pressurized seal. Thus, as the material tends to move into the shallow recessed portion of the gasket, the pressure is exerted on the sidewall or lip portions to increase the effective seal against the adjacent end faces. The gasket material is formed of suitable material with smooth end faces to permit turning action under even high pressures. The gasket is preferably formed of suitable plastic having a very low coefficient of friction such as polyurethane compound or the like. The very minimal amount of material introduced into the gasket area essentially prevents any build-up of material within the space between the pipe sections. It thus provides a highly effective lip sealing while minimizing the adverse characteristics of allowing the material to move inwardly between the pipe sections and into a sealing gasket.

The gasket in accordance with a unique feature is constructed with an unstressed cross-section having an outer solid body portion essentially of a depth corresponding to the distance between the inner surface of the spacer on the coupling unit and the inner wall of the concrete pump pipe. The inner sealing end of the gasket in the unstressed condition includes outwardly flared portions define outwardly flared lip portions with a shallow recess having a generally curved cross-section. When the pipe members are drawn together by the coupling members, the lips collapse inwardly to form a firm sliding engagement with the end faces immediately adjacent to the inner pipe pumping opening of the pipes with the shallow recess accommodating the pressurizing material. This has been found to provide a simple, reliable and highly effective gasket.

In a particularly practical embodiment of the present invention, a two-bolt swivel coupling assembly is formed including similar pipe end members. Each pipe member includes an end swivel section interconnected as a continuation of an outer pipe hose coupling section provided with a suitable clamping recess or other means for interconnecting to another flexible or rigid hose section or the like. The swivel section is formed with the flat face end and the integral outer enlargement having an outer annular circular surface. The width of the surface essentially is on the order of the depth of the pipe section and includes an outer inclined clamping wall or surface merging downwardly into the outer cylindrical exterior wall of the coupling section. Similar semicircular clamp members each having outwardly projecting bolt lug in the abutting plane of the semicircular member are provided. Each member is formed with the same cross-section having a centrally located rectangular spacer jointed by flat ring surfaces to outer clamping lips, the inner wall of which is inclined or chambered generally in accordance with the incline or chamfer on the pipe shoulder. At least one clamp member is provided with axially spaced grease fittings in alignment with the corresponding ring surfaces on the interior of the swivel clamp member. When the clamp members are assembled about the pipe sections, and clamped by suitable interconnecting bolts which extend through the clamping lugs, the pipe members are drawn together with metal to metal contact along the outer inclined walls and the pipe ends abutting the spacer which, of course, forms a backing for the sealing gasket. In the assembled relation, the ring surfaces of the clamp members are spaced from the ring surfaces of the pipe shoulders by a minute distance, for example, on the order of 1/32 of an inch. Grease is introduced therebetween to prevent the metal to metal contact along the extended surfaces.

The present invention particularly in the preferred construction provides a highly effective, reliable and relatively inexpensive swivel coupling assembly for concrete placement systems.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings:

FIG. 1 is a side view of a high pressure swivel coupling assembly for concrete pumping systems, with the swivel clamp unit partially broken away and sectioned to show inner details of construction;

FIG. 2 is a view taken generally on the line 2—2 of FIG. 1;

FIG. 3 is an enlarged vertical section through the gasket shown in FIGS. 1 and 2 in the unstressed state;

FIG. 4 is a fragmentating exploded view of the coupling assembly; and

DESCRIPTION OF THE ILLUSTRATED EMBODIMENT

Figure 5:
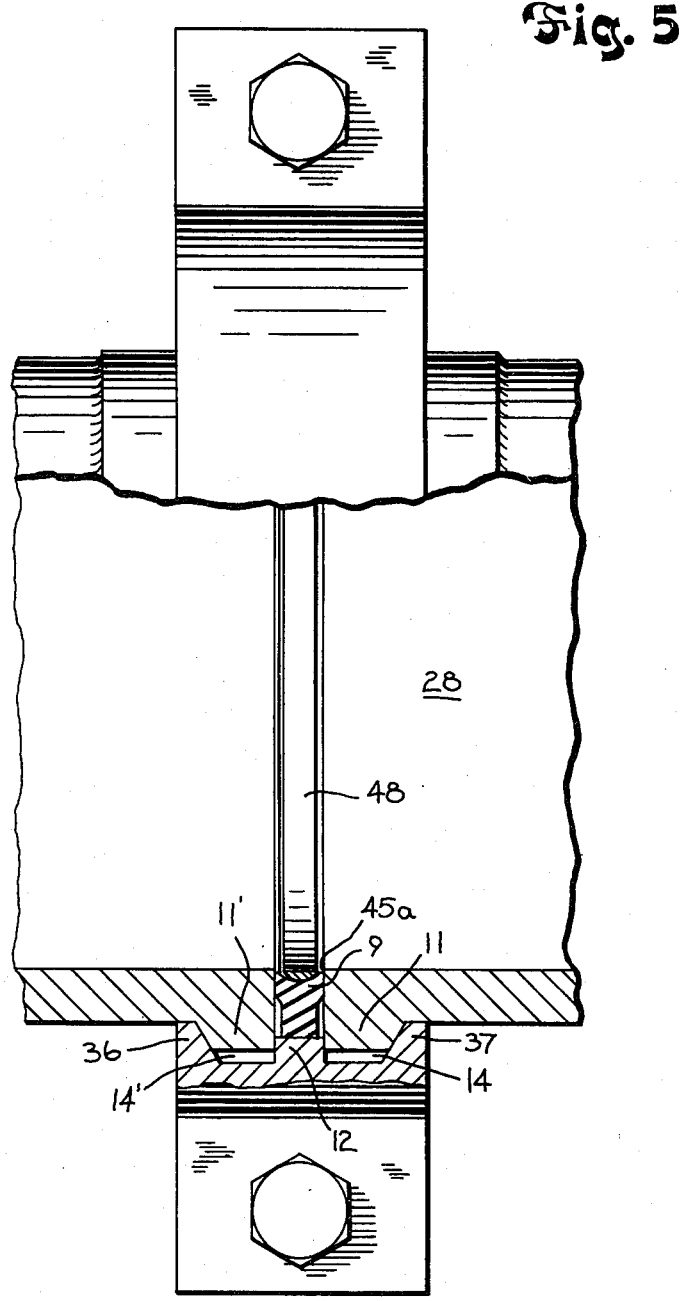
FIGS. 5 and 6 are views of an alternate construction with parts broken away and sectioned to show detail of construction.
Figure 6:
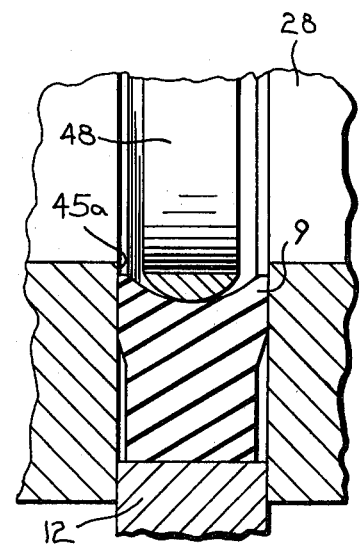

Referring to the drawings and in particular to FIG. 1, the present invention is shown applied to a concrete pumping system in which a flexible hose 1 is interconnected to a flexible hose 2 by a two-bolt swivel coupling apparatus 3 constructed in accordance with the present invention. The hose 1 is connected to a suitable high pressure concrete pumping source 4 such as a reciprocating concrete pump. The hose 1 is a single section which is interconnected to a plurality of other rigid or flexible pumping sections between the illustrated connection and the source 4. Hoses 1 and 2 and apparatus 3 may form part of a collapsible boom structure, not shown, which rotates and is collapsed for transport and the like. In such systems, the adjacent hoses 1 and 2 often are pivoted or twisted relative to each other. The swivel coupling apparatus 3 of this invention swivels to minimize stressing of the hose section.

The second hose 2 is connected to other suitable piping for transport of the concrete to a drop location 5. The several hose and pipe sections are preferably connected by releasable coupling units, such as shown in U.S. Pat. No. 3,705,737 to Robert E. Westerlund, et al. This invention is particularly directed to the construction of the swivel coupling apparatus, a preferred embodiment being shown in the drawing. Consequently, the concrete pump source apparatus as well as the other interconnecting pipe sections, booms, mobile units and the like are not shown or described. Such apparatus may be of any desired construction and will be readily provided by those skilled in the art.

Referring particularly to FIG. 2, the illustrated swivel coupling apparatus of the present invention is shown as a bolted construction in which a pair of similar hose connecting sections 7 and 8 are connected respectively to the hoses 1 and 2. A firm rubber-like gasket 9 is disposed between the sections 7 and 8. An encircling housing or clamp unit 10 surrounds the sections 7 and 8 and gasket 9, and telescopes over connecting enlargements or shoulders 11 and 11' on sections 7 and 8. The clamp unit 10 includes a centrally located spacer 12 which extends downwardly between the outer and opposed end faces 13 and 13' of sections 7 and 8. The spacer 12 limits the collapse or drawing together of sections 7 and 8 and also forming a support or backing for the sealing gasket 9. As most clearly shown in FIG. 2, the construction is such that small gaps 14 and 14' are maintained between the outer faces or walls of the shoulders 11 and 11' and the opposed faces or walls of the clamp unit 10. A pair of axially spaced lubricant fittings 15 and 16 provide means for introducing of grease or other lubricants 17 into the gaps 14 and 14' within the swivel coupling apparatus 3.

The outer clamp housing or unit 10 is illustrated as a two-bolt assembly. The unit 10 includes a pair of housing members 18 and 19 having clamping ears or lugs 20 projecting from the opposite ends. The lugs are apertured and interconnected on diametrically opposite sides by clamping bolt and nut units 21, which when drawn up provide a firm, rigid interconnection of the clamping members 18 and 19 about the sections 7 and 8.

In operation, the concrete is pumped through the piping system including the swivel coupling apparatus 3 as a part of a series of flow paths. The high pressure concrete 23 tends to move outwardly into engagement with the gasket 9. The inner face of the gasket is formed with an annular recess defining a small chamber 24 with sealing legs or lips 25 and 26. The pressurized concrete 23 produces a corresponding pressure on the lips 25 and 26 forcing the lips into sealing engagement with the immediately adjacent end pipe faces 13 and 13'. The higher the pressure, the greater the sealing pressure. The gasket is, of course, backed and prevented from moving outwardly by the spacer 12 of the clamp unit 10. The lubricant 17 introduced into the slight space 14 and 14' provided between the annular ring surfaces or walls within the cavity in clamp unit 10 creates lubrication permitting convenient swiveling of the pipe members relative to each other under even high concrete pumping pressures. Thus, there is essentially no metal to metal pressure surfaces other than in the slight inclined area of the clamping lips, where the pressurized grease is allowed to creep to provide slight lubrication therefore minimizing the effective resistance and permitting the twisting and turning of the coupling at pressures well above 200 PSI. In contrast, in the conventional concrete pumping pipe couplings employing metal to metal clamping, swivel or turning is difficult if not practically impossible within the coupling when pressures increase above 200 PSI.

More particularly, in the illustrated embodiment of the invention, each of the sections 7 and 8 is similarly constructed and the section 7 is described for purposes of explanation. The section 7 includes a hose coupling pipe 27 of a conventional rigid concrete pumping pipe and having an annular groove for releasable connection of a concrete hose as by the conventional toggle clamp unit 6.

A swivel pipe 28 is intimately interconnected to the hose coupling pipe 27. In particular, in the illustrated embodiment of the invention, the swivel pipe 28 is a tubular member having the same inner diameter of pipe 27 but of a wall thickness slightly greater than that of the hose pipe. The pipes 27 and 28 are welded or otherwise intimately joined to each other, as shown by the continuous encircling weld 29 with the inner surfaces aligned and providing a smooth continuous flow passageway. The swivel pipe 28 terminates in a flat and smooth sealing face 13. The shoulder 11 is formed as an annular outwardly projecting portion which extends axially or longitudinally rearwardly a significant distance, generally on the order of the thickness of the pipe 28 and terminates in the outer end in an inclined clamp wall 30. The outer surface is formed as a circular or ring wall 31 extending parallel to the axis of the pipe sections.

The clamp unit 10 includes a pair of similar semi-circular clamp members 18 and 19 having the flat opposing end faces 32. Both ears or lugs 20 are integrally secured to the ends and project outwardly, with the end faces in the plane of end faces of the semi-circular members. The lugs 20 are apertured to accommodate connecting nut and bolt unit 21.

The semi-circular members are each similarly formed with corresponding inner annular recesses or cavities 35 forming the clamping legs 36 and 37 to the opposite sides thereof. Referring to member 18 the centrally located essentially rectangular spacer 12 projects inwardly within the cavity 35 between the clamping legs 36 and 37 and terminates in a cylindrical or circular ring wall or surface 38 which forms a smooth backing wall for the sealing gasket 9. The outer legs 36 and 37 have a greater depth than the spacer 12 and extend beyond the spacer. The legs 36 and 37 also have inner generally radial inclined clamping surfaces or walls 39, with the angle of incline essentially in accordance with the incline of the clamping projections or shoulders 30. The legs 35 and 36 are connected to the inner spacer 12 by similar ring or circular base walls 40 and 41. In the assembled relation, the spacer 12 is located between the outer portion of the end faces of the swivel pipe sections 7 and 8. When the coupling members are securely clamped together by the nut and bolt units 21, the circular bases 40 and 41 within the clamp unit 10 are spaced slightly from the outer ring walls 31 of the shoulders 11 and 11' to define the grease spaces 14 and 14'. In a practical embodiment of a two bolt swivel coupling for interconnecting of the 5¼ inch pipes, a 1/32 inch gap 14 and 14' was provided between the circular walls.

Grease fittings 15 and 16 are provided in the clamp member 18. In the illustrated embodiment, well-known grease coupling members are shown threaded into appropriate openings 42 in the one semicircular clamp member 18. The openings 42 extend from the threaded portion into the interior in alignment with the circular base walls 40 and 41. Thus, the grease 17 or other suitable lubricant is introduced directly into the gap between the swivel pipe section and the clamp member.

In addition, the gasket 9 is preferably uniquely constructed as most clearly shown in FIG. 3, which is an enlarged cross section of the gasket in the unstressed state. The gasket includes an outer solid rectangular body portion 43 forming approximately ⅔rds or more of the total depth of the gasket. The back and side walls are thus flat, smooth walls which are located in abutting engagement with the spacer 12 and the ends of swivel pipes 28. Integrally formed therewith is an inner portion having outwardly inclined or flared lips or walls 44 and 45 connected to the body 43 and to each other with a shallow semicircular curved recess 46. For example, the recess may be on the order of inches at the center of the gasket 9. The flared lips 44 and 45 having small inner edges as at 47, which in the assembled relation are clearly aligned to the inner wall of sections 28. When the swivel pipe sections are drawn together by the interconnection clamp unit 10, the flared lips 44 and 45 are deflected inwardly to the plane of the outer body portion 43 by the flat smooth end faces 13 and 13' of the swivel pipe sections 28 to form a continuous sliding seal across the interface. The projection spacer 12 is slightly larger than the body portion 43 and less than the sealing lips 44 and 45. In the clamped assembly, the lips 44 and 45 are thus compressed against the pipe wall with a very slight space or clearance between the body portion and the pipe ends 13 and 13'. The inner ends of lips 44 and 45 are preferably formed with some body rather than a feathered edge to minimize wear from the concrete. The lips 44 and 45 are generally aligned with the inner wall of the pipe ends and form the seal closely adjacent to and slightly spaced from the inner end as at 45a in FIG. 2 and in FIG. 5. A retaining ring 48 is preferably provided within the gasket 9, as shown in FIG. 5, to positively hold the lips inwardly of the pipe face. This has been found to be significant in concrete piping when a projecting lip may allow abrasive material to enter between the lip and the gasket and results in destruction or significant reduction in the sealing characteristic of the gasket. The spacer 12 and side legs 36 and 37 are constructed with respect to the size of the pipe clamp projections 11 and 11' to produce a very slight clearance or allowance between the bearing surface to facilitate the swivel action. The inclined plane construction produces a self-centering action as the pressurized concrete acts on the pipe sections and gasket sealing lips. Any other self-centering construction such as spherical type surfaces could, of course, also be employed. This further contributes to the creation of reliable and effective liquid tight seal between the swivel sections with the rather small pressurizing chambers.

The present invention has thus been found to provide lubricated swive couplings which can be economically constructed and provide a long reliable operating life in the environment of concrete pumping systems and the like.

Various modes of carrying out the invention are contemplated as being within the scope of the following claims, particularly pointing out and distinctly claiming the subject matter which is regarded as the invention.

We claim:

1. A sealing gasket adapted to be clamped between the ends of a pair of relatively rotatable rigid pipe members, comprising a continuous gasket member having an outer body portion and integral outwardly flared inner side lips, said sealing gasket having an annular recess located between said lips and having a depth substantially less than said sealing lips, said lips being adapted to be deflected inwardly less than the width of said body portion to define a gap adjacent the sidewalls, a rigid spacer member located to the back side of body, said spacer member having a width in excess of said body and less than the distance between the side lips whereby said pipe member may be disposed abutting the ends of the spacer members to define the limits of the deflection of said sealing lips.

2. The sealing gasket of claim 1 wherein said outer body portion is a substantially rectangular body having substantially parallel sidewalls from which said side lips extend.

3. A sealing gasket adapted to be clamped between the ends of a pair of relatively rotatable rigid pipe members having a spacer for holding said pipe members with a selected space between the ends thereof, comprising a continuous gasket member having an outer body portion and integral outwardly flared inner side sealing lips, said sealing gasket having an annular shallow recess located between said lips and having a depth substantially less than said sealing lips, said lips being adapted to be deflected inwardly less than the width of said body portion to define a gap adjacent the sidewalls, said body having a width less than said spacer and said side sealing lips having an undeflected extent greater than the spacer whereby said pipe members are disposed abutting the ends of the spacer and defining the limits of the deflection of said sealing lips with the ends of the pipe members spaced from said body portion of said sealing gasket.

4. The sealing gasket of claim 3 wherein said body portion includes an outer rectangular body having parallel sidewalls and said annular shallow recess is a circular peripheral wall.

* * * * *